US008984085B2

(12) United States Patent
Jung

(10) Patent No.: US 8,984,085 B2
(45) Date of Patent: Mar. 17, 2015

(54) APPARATUS AND METHOD FOR CONTROLLING DISTRIBUTED MEMORY CLUSTER

(75) Inventor: Ki-Young Jung, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 413 days.

(21) Appl. No.: 13/396,329

(22) Filed: Feb. 14, 2012

(65) Prior Publication Data

US 2012/0209943 A1 Aug. 16, 2012

(30) Foreign Application Priority Data

Feb. 14, 2011 (KR) ........................ 10-2011-0012867

(51) Int. Cl.
*G06F 15/167* (2006.01)
*G06F 15/16* (2006.01)
(52) U.S. Cl.
CPC ............ *G06F 15/167* (2013.01); *G06F 15/161* (2013.01)
USPC ........................................................ 709/213
(58) Field of Classification Search
USPC .................................. 709/213; 707/752, 822
See application file for complete search history.

(56) References Cited

U.S. PATENT DOCUMENTS

| 6,928,459 | B1 | 8/2005 | Sawdon et al. | |
|---|---|---|---|---|
| 8,321,454 | B2 * | 11/2012 | Berlyant et al. | 707/770 |
| 8,364,923 | B2 * | 1/2013 | O'Brien et al. | 711/165 |
| 2008/0027920 | A1 * | 1/2008 | Schipunov et al. | 707/4 |
| 2008/0114865 | A1 * | 5/2008 | Rothman et al. | 709/223 |
| 2009/0307334 | A1 * | 12/2009 | Maltz et al. | 709/219 |
| 2010/0281166 | A1 * | 11/2010 | Buyya et al. | 709/226 |
| 2011/0161294 | A1 * | 6/2011 | Vengerov et al. | 707/637 |
| 2011/0211449 | A1 * | 9/2011 | Attar et al. | 370/235 |
| 2011/0295855 | A1 * | 12/2011 | Wang et al. | 707/737 |
| 2011/0296422 | A1 * | 12/2011 | Hildebrand et al. | 718/102 |
| 2012/0101991 | A1 * | 4/2012 | Srivas et al. | 707/623 |
| 2012/0259983 | A1 * | 10/2012 | Nakadai | 709/226 |

FOREIGN PATENT DOCUMENTS

| KR | 10-2009-0065133 A | 6/2009 |
|---|---|---|
| KR | 10-2009-0066010 A | 6/2009 |
| KR | 10-2010-0092850 A | 8/2010 |

(Continued)

OTHER PUBLICATIONS

Variable Size Map and Locality-Aware Reduce on Public-Resource Grids Po-Cheng Chen et al., GPC 2010, LNCS 6104, pp. 234-243.*

(Continued)

*Primary Examiner* — Brian J Gillis
*Assistant Examiner* — Steve Lin
(74) *Attorney, Agent, or Firm* — IP Legal Services, LLC

(57) ABSTRACT

Provided are an apparatus and method for controlling a distributed memory cluster. A distributed computing system may include a computing node cluster, a distributed memory cluster, and a controlling node. The computing node cluster may include a plurality of computing nodes including first computing nodes that each generates associated data. The distributed memory cluster may be configured to store the associated data of the first computing nodes. The controlling node may be configured to select memory blocks of the associated data for distribution on the distributed memory cluster based on a node selection rule and memory cluster structure information, and to select second computing nodes from the computing node cluster based on a location selection rule and the memory cluster structure information.

18 Claims, 5 Drawing Sheets

(56) References Cited

FOREIGN PATENT DOCUMENTS

| | | |
|---|---|---|
| KR | 10-2010-0121209 A | 11/2010 |
| KR | 10-2010-0122197 A | 11/2010 |

OTHER PUBLICATIONS

Locality Aware Reduce Task Scheduling for MapReduce Mohammad Hammound et al., IEEE CloudCom.2011.87 Nov. 2011.*

* cited by examiner

APPARATUS AND METHOD FOR CONTROLLING DISTRIBUTED MEMORY CLUSTER

CROSS REFERENCE TO PRIOR APPLICATIONS

The present application claims priority under 35 U.S.C. §119 to Korean Patent Application No. 10-2011-0012867 (filed on Feb. 14, 2011), which is hereby incorporated by reference in its entirety.

FIELD OF THE INVENTION

The present invention relates to distributed computing system and, in particular, to controlling a distributed memory cluster.

BACKGROUND OF THE INVENTION

A distributed data processing system has been introduced to process a large number and amount of data sets where the data sets are in a difficult form to use (sometimes referred to as "messy data") using physically distributed computing nodes. In order to efficiently and rapidly process the messy data sets, distributed data processing systems have employed various types of parallel technologies. MapReduce may be one of the parallel technologies employed to improve performance and efficiency in data processing.

MapReduce has been introduced by Google to support a distributed data processing system. MapReduce is a software framework for processing highly distributable problems across huge datasets using a large number of computers (nodes), collectively referred to as a "cluster," if all nodes use the same hardware, or a "grid," if the nodes use different hardware. Computational processing might occur on data stored either in a file system or in a database. The "Map" step comprises a master node receiving an input problem, partitioning the problem into smaller sub-problems, and distributing the sub-problems to worker nodes. A worker node may do this again in turn, leading to a multi-level tree structure. The worker node processes the smaller problem, and passes the answer back to its master node. The "Reduce" step comprises the master node then collecting and combining the answers to all the sub-problems to form an output solution to the problem.

MapReduce as a software framework for processing messy data uses a large number of computing nodes to process the messy data into a useful format. MapReduce may include an input reader, a map function, a partition function, a reduce function, and an output writer. The input reader may divide input data into a plurality of data blocks and assign one data block to each map function. Each map function may process the assigned data block and generate intermediate data. The partition function may allocate each map function to a particular reducer. The reducer may be a computing node performing the reduce function. The reducer may process, at least intermediately, a given map function and generate intermediate (output) data.

The map function may store intermediate data at a storage node included in a distributed memory cluster including a plurality of storage nodes. The map function may randomly select one of the storage nodes to store the intermediate data. Accordingly, many intermediate data portions may be concentrated at one particular storage node. Furthermore, a reducer is allocated to a map function without considering physical locations of associated nodes or network congestion between a storage node and a reducer. Such a manner of storing the intermediate data may degrade an overall performance of the distributed data processing system.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a storage node may be efficiently selected for approximately uniform distribution of multiple intermediate data throughout storage nodes in a distributed memory cluster.

In accordance with another aspect of the present invention, a location of a reducer may be selected in consideration of a physical distance and network congestion in a distributed computing system.

In accordance with an exemplary embodiment of the present invention, a distributed computing system may include a computing node cluster, a distributed memory cluster, and a controlling node. The computing node cluster may include a plurality of computing nodes including first computing nodes that each generates associated data. The distributed memory cluster may be configured to store the associated data of the first computing nodes. The controlling node may be configured to select memory blocks of the associated data for distribution on the distributed memory cluster based on a node selection rule and memory cluster structure information, and to select second computing nodes from the computing node cluster based on a location selection rule and the memory cluster structure information.

According to the node selection rule, the controller node may be configured to assign the associated data to server racks included in the distributed memory cluster, and select the memory blocks from each of the server racks up to a number of the generated data assigned to each server rack.

The controller node may be configured to use a round robin scheme to assign the associated data to the server racks.

The controlling node may be configured to select, from memory blocks included in each of the server racks, a memory block having an available capacity greater than a given capacity.

The memory blocks may be included in at least one storage node included in each of the server racks.

According to the location selection rule, the controlling node may be configured to select a computing node included in a server rack storing the associated data of at least a given data amount, and control the selected computing node, as one of the second computing nodes, to process the data stored in the same server rack.

The controlling node may be further configured to control the selected computing node, as one of the second computing nodes, to process the data stored in another one of the server racks storing the associated data less than the given data amount.

The distributed computing system may perform a MapReduce operation. In this case, the first computing nodes may perform a map function, and the associated data of the first computing nodes may be intermediate data. The second computing nodes may perform a reduce function.

A number of memory blocks required to store the generated data may be determined based on partition information generated by a partition function of the MapReduce operation. A number of second computing nodes may be determined to be substantially equivalent to a number of storing nodes including the memory blocks required to store the generated data based on the partition information.

The memory cluster structure information may include identifiers of server racks included in the distributed memory cluster, identifiers of storage nodes included in the server racks, identifiers of memory blocks included in the storage nodes, identifiers of the first computing nodes generating the data, identifiers of the second computing node processing the stored data, and server rack switch information.

In accordance with another embodiment of the present invention, a method may be provided for controlling a distributed memory cluster on a distributed computing system. The method may include generating associated data from first computing nodes, selecting memory blocks distributed on the distributed memory cluster based on a node selection rule and memory cluster structure information, storing the generated, associated data at the selected memory blocks, selecting second computing nodes based on a location selection rule and the memory cluster structure information, and controlling the selected second computing node to process the data stored in the selected memory block.

The node selection rule of the selecting memory blocks may include assigning the generated, associated data to server racks included in the distributed memory cluster, and selecting the memory blocks from each of the server racks up to a number of the generated, associated data assigned to each of the server racks.

In the assigning the generated, associated data to server racks, a round robin scheme may be employed. In the selecting the memory blocks from each of the server racks, a memory block having an available capacity of at least a given capacity may be selected from memory blocks included in each server rack.

The memory blocks may be included in at least one storage node included in each of the server racks.

The location selection rule of the selecting second computing nodes may include selecting a computing node included in a given server rack storing the generated, associated data greater than a given data amount, and controlling the selected computing node, as one of the second computing nodes, to process the data stored in the given server rack.

The location selection rule of the selecting second computing nodes may further include controlling the selected computing node, as one of the second computing nodes, to process the data stored in another one of the server racks storing the generated data less than the given data amount.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
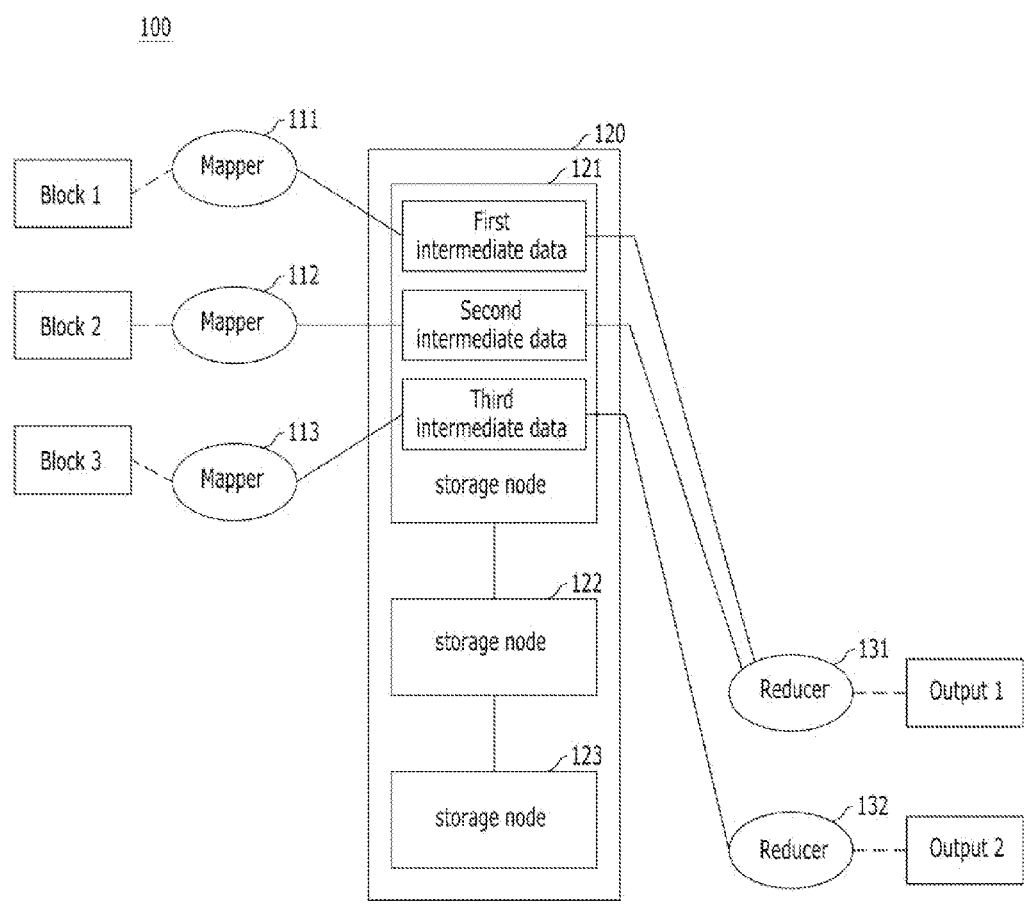
FIG. 1 illustrates a distributed computing system employing MapReduce.

Reference will now be made in detail to embodiments of the present invention, examples of which are illustrated in the accompanying drawings, wherein like reference numerals refer to like elements throughout. The embodiments are described below, in order to explain the present invention by referring to the figures.

For convenience and ease of understating, an apparatus and method for controlling a distributed memory cluster in accordance with an exemplary embodiment of the present invention will be described as controlling a distributed memory cluster based on MapReduce. The present invention, however, is not limited thereto. Embodiments of the present invention may be applied to control a distributed memory cluster adapting other parallel data processing technologies. Embodiments of the present invention efficiently select i) a storage node for approximately uniform distribution of multiple intermediate data throughout storage nodes in a distributed memory cluster and ii) select a location of a reducer in consideration of a physical distance and network congestion in a distributed computing system.

Prior to describing embodiments of the present invention, a MapReduce operation will be described with a distributed computing system. The distributed computing system may employ a MapReduce framework to improve performance and efficiency in parallel computing.

FIG. 1 illustrates a distributed computing system employing MapReduce.

Referring to FIG. 1, distributed computing system 100 may include mappers 111 to 113, distributed memory cluster 120, and reducers 131 to 133.

Mappers 111 to 113 and reducers 131 and 132 may be computing nodes distributed on distributed computing system 100. Although mappers 111 to 113 and reducers 131 and 132 are each illustrated as an individual computing node, at least one of mappers 111 to 113 and reducers 131 and 132 may be implemented in one computing node. Mappers 111 to 113, reducers 131 and 132, and distributed memory cluster 120 may be coupled through a wired and/or wireless communication network or a physical cable.

Distributed computing system 100 may perform a MapReduce operation. For example, distributed computing system 100 may receive an input data and divide the input data into a plurality of data blocks, for example, three data blocks 1 to 3. Such an operation may be performed by an input reader function of MapReduce. A computing node included in distributed computing system 100 may perform such input reader function. Distributed computing system 100 may transfer data blocks 1 to 3 to mappers 111 to 113, respectively.

Mappers 111 to 113 may receive data blocks 1 to 3 and process corresponding data blocks 1 to 3, respectively. For example, mapper 111 may receive data block 1, process data block 1, and generate a first intermediate data. After generating the first intermediate data, mapper 111 may store the first intermediate data in distributed memory cluster 120. Similarly, mapper 112 and 113 also generate second and third intermediate data and store the second and third intermediate data in distributed memory cluster 120.

Distributed memory cluster 120 may include a plurality of storage nodes 121 to 123 distributed on distributed computing system 100. Each storage node 121, 122, or 123 may denote a physically independent computing node. Such a storage node may be included in one server rack. One server rack may include more than one storage nodes. For example, the storage nodes 121 and 122 may be included in one server rack. Furthermore, each storage node 121, 122, or 123 may include a plurality of memory blocks. Distributed memory cluster 120 may receive the intermediate data from mappers 111 to 113 and store the received intermediate data in at least one of storage nodes 121 to 123. For example, one intermediate data may be stored in one storage node or multiple intermediate data may be stored in one storage node.

Each reducer 131 and 132 may be allocated to at least one of mappers 111 to 113. Such an operation may be performed by a partition function of MapReduce. For example, reducer 131 may be allocated to mapper 111 and 112, and reducer 132 may be allocated to mapper 113. Reducers 131 and 132 may collect intermediate data from allocated mappers 111 to 113. For example, reducer 131 may collect intermediate data of mappers 111 and 113. Particularly, reducer 131 may read the first and second intermediate data stored in storage node 121, combine the read first and second intermediate data, and generate a first data output 1. Reducer 132 may read the third intermediate data stored in storage node 121, process the read third intermediate data, and generate a second data output 2.

As described above, the multiple intermediate data may be randomly stored in storage nodes 121 to 123 of distributed memory cluster 120. Since a rule is not defined to select a storage node to store each intermediate data, multiple intermediate data may be concentrated at one particular storage node. For example, FIG. 1 illustrates storage node 121 stores three intermediate data 1, 2, and 3, while storage nodes 122 and 123 store no intermediate data. In this manner, intermediate data may not be efficiently stored in storage nodes 121 to 123.

Furthermore, physical locations and network congestion may not be considered for allocating reducers 131 and 132 to storage nodes 121 to 123. For example, a distance between storage node 121 and reducer 131 may not be closer than a distance between storage node 122 and reducer 131 as illustrated in FIG. 1. However, reducer 131 is allocated to storage 121. Since reducers 131 and 132 collect intermediate data from storage nodes 121 to 123, physical locations of reducers 131 and 132 and storage nodes 121 to 123 and network congestion therebetween are important factors for overall system performance. Accordingly, such an allocation manner may degrade an overall performance of distributed computing system 100.

In accordance with an exemplary embodiment of the present invention, a distributed computing system may store intermediate data generated from mappers so as to approximately uniformly distribute intermediate data throughout storage nodes. Accordingly, multiple intermediate data may not be concentrated at one particular storage node, and network bandwidth of a distributed memory cluster may be effectively managed in a distributed computing system. Furthermore, physical locations and network congestion may be considered to allocate reducers in accordance with an exemplary embodiment of the present invention. Accordingly, reducers may effectively and rapidly collect and combine intermediate data stored in storage nodes. As a result, overall performance of a distributed computing system may be improved. Hereinafter, a distributed computing system in accordance with an embodiment of the present invention will be described with reference to FIGS. 2 to 5.

Figure 2:
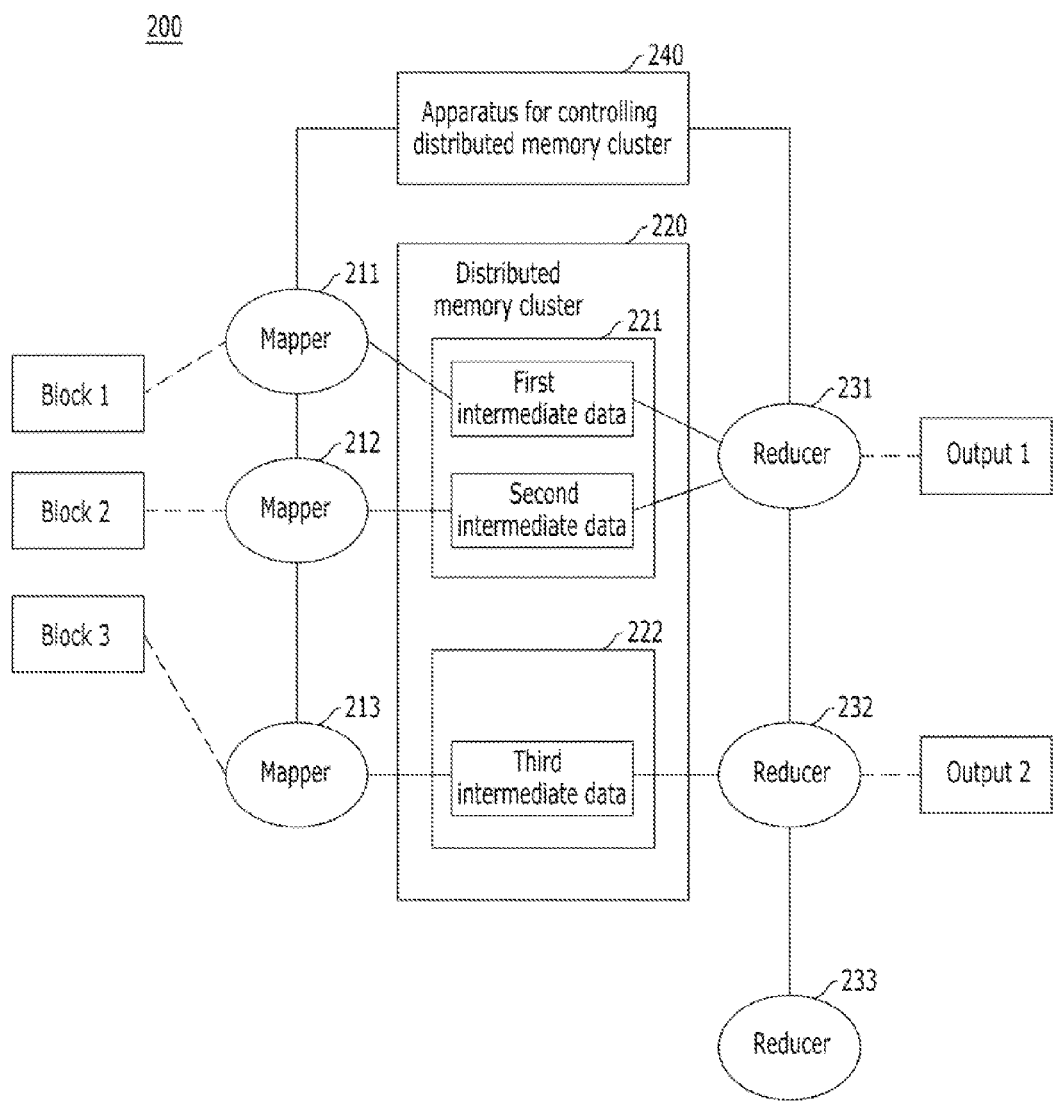
FIG. 2 illustrates a distributed computing system in accordance with an exemplary embodiment of the present invention.

FIG. 2 illustrates a distributed computing system in accordance with an exemplary embodiment of the present invention.

Referring to FIG. 2, distributed computing system 200 may include mappers 211 to 213, distributed memory cluster 220 having storage nodes 221 and 222, and reducers 231 to 233. Unlike a typical distributed computing system, distributed computing system 200 may further include apparatus 240 for controlling distributed memory cluster 220 in accordance with an exemplary embodiment of the present invention.

Apparatus 240 may be coupled to mappers 211 to 213, distributed memory cluster 220, and reducers 231 to 233 through a wired/wireless communication network or a cable. Apparatus 240 may be a computing node on distributed computing system 200, but the present invention is not limited thereto. Although apparatus 240 is illustrated as an independent node, apparatus 240 may be implemented integrally within one of the computing nodes on distributed computing system 200. In accordance with an exemplary embodiment of the present invention, apparatus 240 may select locations of storing intermediate data output from mappers 211 to 213 to uniformly distribute intermediate data throughout storages nodes 221 and 222. That is, apparatus 240 may approximately uniformly distribute intermediate data generated from mappers 211 to 213 throughout storage nodes 221 to 223 in order to prevent multiple intermediate data from being concentrated at one particular storage node. Furthermore, apparatus 240 may allocate reducers 231 to 233 in consideration of physical locations of reducer 231 to 233 and network congestion between reducers 231 to 233 and storage nodes 221 and 222 of distributed memory cluster 220. Such an operation of apparatus 240 will be described in detail with reference to FIG. 3 later.

As described above, mappers 211 to 213 and reducers 231 to 233 may be computing nodes distributed on distributed computing system 200. Although mappers 211 to 213 and reducers 231 to 233 are illustrated as an individual computing node, at least one of mappers 211 to 213 and reducers 231 to 233 may be implemented in one computing node. Mappers 211 to 213, reducers 231 to 233, and distributed memory cluster 220 may be coupled through a wired and/or wireless communication network or a physical cable with apparatus 240.

Distributed computing system 200 may perform a MapReduce operation. For example, distributed computing system 200 may receive an input data and divide the input data into a plurality of data blocks, for example three data blocks 1 to 3. Such an operation may be performed by an input reader function of MapReduce. A computing node included in distributed computing system 200 may perform such input reader function. Distributed computing system 200 may transfer data blocks 1 to 3 to mappers 211 to 213, respectively.

Mappers 211 to 213 may receive data blocks 1 to 3, process corresponding data blocks 1 to 3, and output first to third intermediate data. The input data blocks 1 to 3 may have variable formats. Mappers 211 to 213 may convert the input data blocks 1, 2 and 3 to the first, second and third intermediate data desirably having a standardized format. For example, mapper 211 may receive data blocks 1, process data blocks 1, and generate a first intermediate data. The input data blocks 1 to 3 may have variable formats. Similarly, mappers 212 and 213 may receive data blocks 2 and 3, process data blocks 2 and 3, and generate a second intermediate data and a third intermediate data, respectively. After generating the intermediate data, mappers 211 to 213 may store the intermediate data at storage nodes 221 and 222 in response to control of apparatus 240. Particularly, apparatus 240 may control mappers 211 to 213 and select storage nodes 221 and 222 for storing intermediate data generated from mappers 211 to 213. In order to select storage nodes 221 and 22, apparatus 240 may refer to a node selection rule and memory cluster structure information. The node selection rule and the memory cluster structure information are described subsequently.

Distributed memory cluster 220 may include a plurality of storage nodes 221 and 222 distributed on distributed computing system 200. Each storage node 221 or 222 may be a physically independent computing node. Storage nodes 221 and 222 may be included in one server rack as illustrated in FIG. 2. The present invention, however, is not limited thereto. One server rack may include more than two storage nodes or one server rack may include only one storage node. Furthermore each storage node 221 or 222 may include at least one of memory blocks.

A structure of distributed memory cluster 220 may be indicated by the memory cluster structure information. For example, the memory cluster structure information may include identifiers of server racks included in distributed memory cluster 220, identifiers of storage nodes included in server racks, identifiers of memory blocks included in storage nodes, mapper identifiers of mappers 211 to 213, reducer identifiers of reducers 231 and 232, contact switch information, and rack switch information. The memory cluster structure information may be used for apparatus 240 to select storage locations of intermediate data and to select locations of reducers 231 and 232.

Under the control of apparatus 240, distributed memory cluster 220 may receive the intermediate data from mappers 211 to 213 and store the received intermediate data approximately uniformly throughout storage nodes 221 and 222. Apparatus 240 may adapt various methods for approximately uniformly distributing multiple intermediate data throughout storage nodes in distributed memory cluster 220. In accordance with an exemplary embodiment of the present invention, partition information may be used for selecting a particular storage node in distributed memory cluster 220. Partition information may be generated during performing a map operation. For example, a partition function of MapReduce may generate the partition information. The partition information may be information on reducer allocation, such as the index of the desired reducer. Each intermediate data may have partition information. The partition information may be used for selecting particular storage nodes in distributed memory cluster 220. In accordance with another exemplary embodiment of the present invention, storage nodes in distributed memory cluster 220 may be grouped together based on predicted partition information, for example, the number of reducers, and a particular storage node may be selected from a corresponding group based on a hash value of intermediate data to be stored.

Particularly, distributed memory cluster 220 may receive a total partition number, partition information of intermediate data to be stored, and the intermediate data when distributed memory cluster 220 receives a request for storing the intermediate data. Distributed memory cluster 220 may group storage nodes as many as the total partition number, as a virtual internal block. Here, the total partition number may be the same as the number of reducers. When intermediate data is stored, a corresponding virtual internal block may be identified based on the partition information of the intermediate data, and the intermediate data may be stored in a storage node corresponding to the virtual internal block. When a plurality of storage nodes is included in one server rack, a hash value may be generated based on values of intermediate data to be stored, and one of the storage nodes may be selected based on the generated hash value.

For example, apparatus 240 may select memory blocks of storage nodes to store the received intermediate data based on the node selection rule and the memory cluster structure information. The number of memory blocks may be the same as the number of input data blocks or the number of intermediate data. The intermediate data generated from mappers 211 to 213 may be distributedly store in the memory blocks of storage nodes 221 and 222. For example, two memory blocks of storage node 221 may be selected and the first and second intermediate data may be stored at the selected memory blocks of storage node 221. One memory block of storage node 222 may be selected, and the third intermediate data from mapper 213 may be stored in the selected memory block of storage node 222.

Each reducer 231 or 232 may be allocated to at least one of mappers 211 to 213 and collect intermediate data stored in corresponding storage nodes in distributed memory cluster 220. After collecting, reducers 231 and 232 combine intermediate data and generate output data 1 and 2. In accordance with an exemplary embodiment of the present invention, apparatus 240 may select locations of reducers 231 and 232. In order to improve perform of reading intermediate data from storage nodes, physical locations and network congestion may be considered to select locations of reducers 231 and 232. Particularly, apparatus 240 may a location physically close to storage nodes storing intermediate data generated from corresponding mappers. Apparatus 240 may refer the memory cluster structure information and a location selection rule for this purpose.

As described above, apparatus 240 in accordance with an exemplary embodiment of the present invention may control distributed memory cluster 220 for approximately uniformly distributing intermediate data throughput storage nodes 221 and 222. Furthermore, apparatus 240 may select locations for access by reducers 231 and 232 based on physical locations and network congestion. Accordingly, overall performance of distributed computing system 200 may be improved. Hereinafter, apparatus 240 will be described in more detail with reference to FIG. 3

Figure 3:
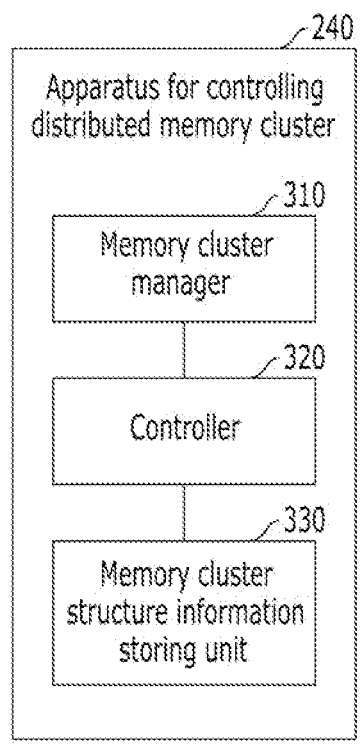
FIG. 3 illustrates an apparatus for controlling a distributed memory cluster in accordance with an exemplary embodiment of the present invention.

FIG. 3 illustrates an apparatus for controlling a distributed memory cluster in accordance with an exemplary embodiment of the present invention.

Referring to FIG. 3, apparatus 240 may include memory cluster manager 210, controller 320, and memory cluster structure information storing unit 230.

Memory cluster manager 310 may determine the number of memory blocks required to store intermediate data generated from mappers 211 to 213. Such determination may be made based on partition information generated during performing a map function of MapReduce. Particularly, the partition information may be generated by a partition function of MapReduce. The partition function may allocate reducers to mappers. Each generated intermediate data may have an associated partition function. With the partition function, the number of reducers and the number of memory blocks required to store intermediate data may be determined. The memory blocks may be a virtual memory included at least one storage node included in a server rack.

Furthermore, memory cluster manager 310 may set the number of reducers to be identical to the number of storage nodes including the memory blocks required to store the intermediate data generated by mappers.

Controller 320 may i) select memory blocks to store intermediate data based on a node selection rule and memory cluster structure information and ii) select locations of reducers based on a location selection rule and the memory cluster structure information. In accordance with an exemplary embodiment of the present invention, controller 320 may select memory blocks and reducer locations to prevent bottle neck problems in data processing. A bottle neck problem may be caused when multiple intermediate data are concentrated at one particular storage node.

As described above, controller 320 may select memory blocks included in distributed memory cluster in order to approximately uniformly distribute intermediate data throughout storage nodes in distributed memory cluster. Controller 320 may refer to the node selection rule and the memory cluster structure information to select the memory blocks. Particularly, controller 320 may refer the memory cluster structure information to determine constituent elements included in distributed memory cluster. Based on the memory cluster structure information, controller 320 may determine the number of server racks, the number of storage nodes included in each server rack, the number of memory blocks included in each storage node, available storage capacities of storage nodes, and likes.

Based on the determination, controller 320 may select memory blocks to store the intermediate data generated from mappers according to the node selection rule. The node selection rule may include a rule for assigning intermediate data to server racks, a rule for selecting storage nodes from each server rack, and a rule for selecting memory blocks from the selected each storage node. In accordance with an exemplary embodiment, a round robin scheme may be used to assigning intermediate data to server racks, and available capacity of each storage node and each memory block may be used to select storage nodes from each server rack and to select memory blocks from each storage node. Furthermore, a distance from a mapper to a memory block and related network congestion may be included in the node selection rule for assigning memory blocks to mappers, but the present invention is not limited thereto.

For example, controller 320 may select the memory blocks based on the node selection rule as follows. At a first step, controller 320 may assign the intermediate data to server racks. The round robin scheme may be used for assigning. Particularly, controller 320 may approximately uniformly distribute multiple intermediate data generated from mappers 211 to 213 to server racks. For example, when mappers 211 to 213 generate three intermediate data and distributed memory cluster 240 includes three server racks, controller 320 may assign one intermediate data to each server rack. That is, the first intermediate data generated from mapper 211 may be assigned to the first server rack. The second intermediate data generated from mapper 212 may be assigned to the second server rack. The third intermediate data generated from mapper 213 may be assigned to the third server rack. For another example, when three mappers 211 to 213 generate three intermediate data and when distributed memory cluster includes two serve racks, controller 320 may assign the three intermediate data to two server racks using a round robin scheme. That is, the first intermediate data from mapper 211 may be assigned to the first server rack, the second intermediate data from mapper 212 may be assigned to the second server rack, and the third intermediate data from mapper 213 may be assigned to the first server rack. Accordingly, two intermediate data are assigned to the first server rack, and one intermediate data is assigned to the second server rack.

At a second step, controller 320 may select storage nodes from each server racks as many as the number of intermediate data assigned to each server rack. Storage nodes may be selected based on available storage capacity of each storage node. For example, since the first server rack is assigned with two intermediate data, two storage nodes may be selected from the first server rack. If the first server rack includes more than two storage nodes, available storage capacity of each storage node may be compared to others.

At a third step, controller 320 may select memory blocks included in the selected storage node. Controller 320 may also compare available capacities of memory blocks to a given threshold. Controller 320 may select a memory block having the largest available capacity.

After selecting the memory blocks to store the intermediate data, controller 320 may select locations of reducers based on a location selection rule and the memory cluster structure information. The reducer may be a computing node performing a reduce function on distributed computing system 200. In accordance with exemplary embodiment of the present invention, controller 320 may select the location of the reducer based on the location selection rule. The location selection rule may include a rule of selecting a computing node included in a server rack including a storage node storing intermediate data greater than a given intermediate data amount. Since a reducer is allocated at a server rack including a storage node storing the greater intermediate data, bottle neck problems may be minimized, and a relative short path between a reducer and a storage node may be maintained.

For example, controller 320 may select a computing node located at a server rack including a storage node storing the intermediate data greater than a given intermediate data amount. Then, controller 320 may control the selected computing node to perform a reduce function. Since the reducer is located at the same server rack including the storage node storing the intermediate data greater than the given intermediate data amount, the reducer may pass one switch to collect and process related intermediate data. Accordingly, a relative short path between a reducer and a corresponding memory block may be maintained. If a reducer is located a server rack different from a server rack including a storage node storing the intermediate data greater than the given intermediate data amount, a path between the reducer and the corresponding memory block may become extended as long as the number of switches. Therefore, to select a location of a reducer, a physical distance between a reducer and a memory block, a network structure, and a congestion weight may be considered in accordance with an embodiment of the present invention.

Memory cluster structure information storing unit 330 may store memory cluster structure information for selecting memory blocks to store intermediate data and for selecting a location of a reducer. The memory cluster structure information may include information on a structure of distributed memory cluster 220. For example, the memory cluster structure information may include identifiers of server racks included in distributed memory cluster 220, identifiers of storage nodes included in server racks, identifiers of memory blocks included in storage nodes, identifiers of mappers 211 to 213, identifiers of reducers 231 and 232, contact switch information, and rack switch information.

Hereinafter, an operation of the apparatus 240 for controlling distributed memory cluster will be described in detail with reference to FIG. 4.

Figure 4:
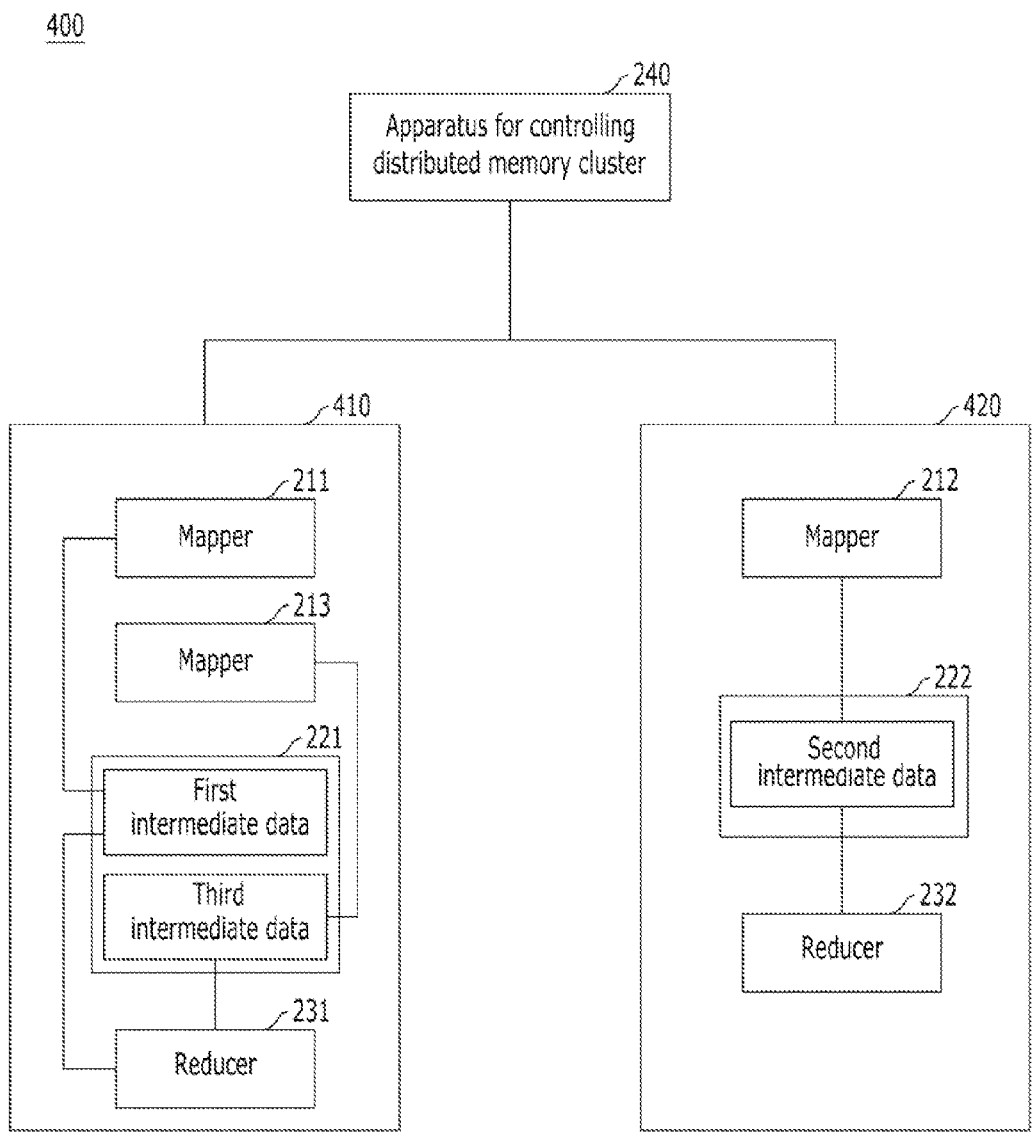
FIG. 4 illustrates a distributed computing system in accordance with another exemplary embodiment of the present invention.

FIG. 4 illustrates a distributed computing system in accordance with another exemplary embodiment of the present invention.

As illustrated in FIG. 4, distributed computing system 400 may include two server racks 410 and 420. Server racks 410 and 420 may form a distributed memory cluster with storage nodes 221 and 222. Furthermore, server racks 410 and 420 may include mappers 211 to 213 and reducers 231 and 232. As described above, mappers 211 to 213 and reducers 231 and 232 may computing nodes performing a map function or a reduce function. Particularly, mappers 211 and 212 and reducer 231 may be computing nodes included in first server rack 410. Mapper 213 and reducer 232 may be computing nodes included in second server rack 420.

Mappers 211 to 213 may receive input data blocks from a node, for example, that performs an input reader function of MapReduce. Mappers 211 to 213 may process the input data blocks and generate first intermediate data, second intermediate data, and third intermediate data, respectively.

In order to store the first, second, and third intermediate data, apparatus 240 may select memory blocks included in a distributed memory cluster which may be formed of storages 221 and 222. As described above, apparatus 240 may use the node selection rule and the memory cluster structure information to select memory blocks. At first, apparatus 240 may approximately uniformly distribute the intermediate data throughout first and second server racks 410 and 420. In accordance with an exemplary embodiment of the present invention, a round robin scheme may be used. For example, the first intermediate data may be assigned to first server rack 410 and the second intermediate data may be assigned to second server rack 420. The third intermediate data may be assigned to first server rack 410 using a mod equation, such as 3 mod 2=1. In the mod equation, '3' may denote the number of intermediate data, and '2' may denote the number of server racks.

After assigning first and second server racks 410 and 420 with the intermediate data, storage nodes may be selected from each server rack 410 or 420 based on available capacity of a storage node. When a selected storage node does not have enough available capacity, i) another storage node may be selected from the same server rack; and ii) a storage node may be selected from another server rack. Furthermore, when a corresponding server rack does not have a storage node having an available capacity, storage nodes may be selected from another server rack.

As illustrated in FIG. 4, since the first and third intermediate data are assigned to the server rack 410, storage node 221 may be selected and the first and third intermediate data may be stored corresponding memory blocks of storage node 221. Furthermore, since the second intermediate data is assigned to the second server rack 420, storage node 222 may be selected, and the second intermediate data is stored in a corresponding memory block of storage node 222.

Apparatus 240 may select a location of a reducer to perform a reduce function based on the location selection rule and the memory cluster structure information after storing intermediate data at selected storage nodes 221 and 222. For example, apparatus 240 may select computing node corresponding to reducer 231 located in the same server rack including storage node 221 storing the first and second intermediate data. Then, apparatus 240 may control the selected computing node 231 to perform a reduce function for the first and third intermediate data stored in storage node 221. Similarly, computing node corresponding to reducer 232 may be selected to perform a reduce function for the second intermediate data stored in storage node 222. When a corresponding server rack does not have a computing node with an available processing power, a computing node included in another server rack may be selected.

Figure 5:
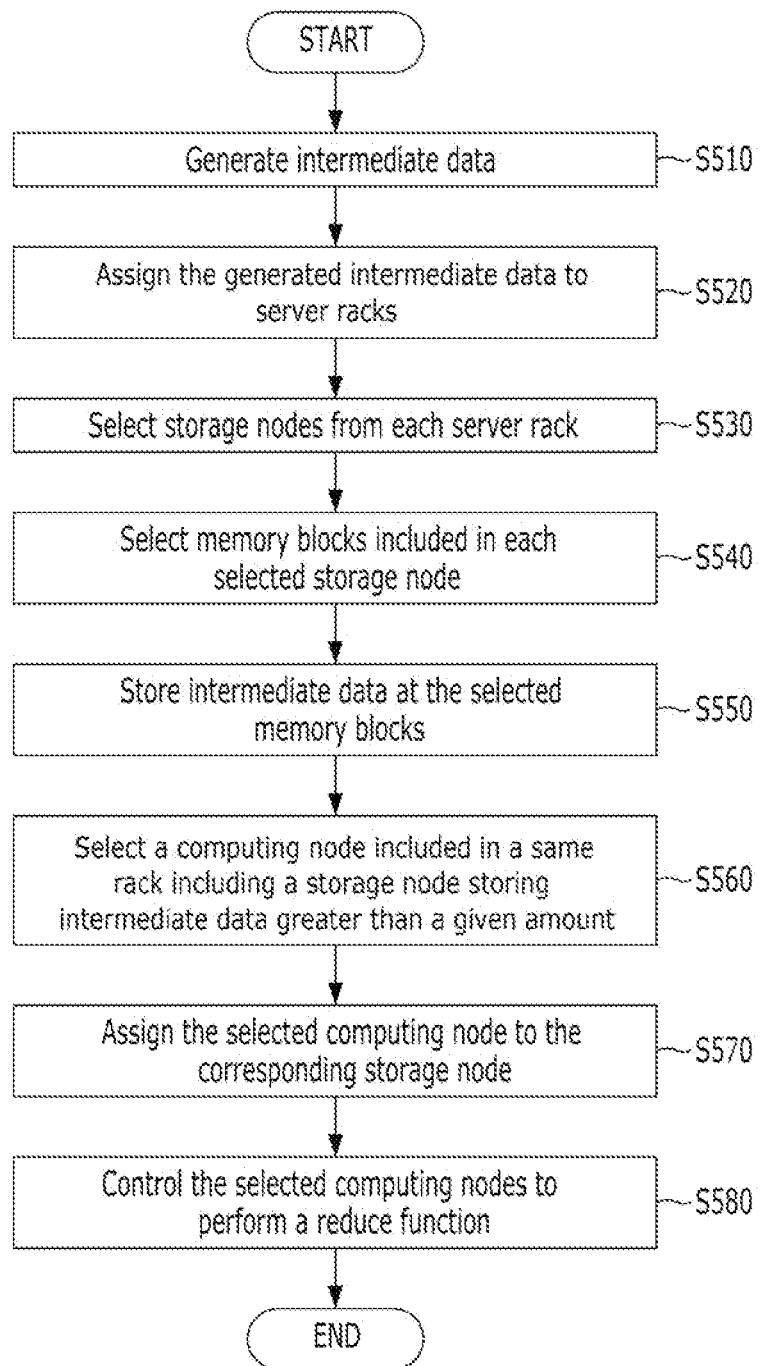
FIG. 5 illustrates a method for controlling a distributed memory cluster in accordance with an exemplary embodiment of the present invention.

FIG. 5 illustrates a method for controlling a distributed memory cluster in accordance with an exemplary embodiment of the present invention.

Referring to FIG. 5, intermediate data may be generated at step S510. For example, mappers may receive input data blocks, which are divided from an input data by a node performing as an input reader of MapReduce. The mappers may generate intermediate data by processing the received input data blocks.

The generated intermediate data may be assigned with server racks included in a distributed memory cluster at step S520. For example, an apparatus for controlling a distributed memory cluster in accordance with an embodiment of the present invention may select memory blocks from the distributed memory based on the node selection rule and the memory cluster structure information in order to store the generated intermediate data with uniform distribution in the distributed memory cluster. As a first step, the generated intermediate data may be assigned to server racks using a round robin scheme, but the present invention is not limited thereto.

After assigning, storage nodes may be selected from each server rack at step S530. For example, the controlling apparatus may select a storage node from each server rack based on available capacity of a storage node. After selecting the storage node, memory blocks may be selected from the selected storage node at step S540. For selecting the memory blocks, available capacity of a memory block may be considered. Then, the generated intermediate data may be stored in the selected memory blocks at step S550. Since the generated intermediate data are stored based on the node selection rule and the memory cluster structure information, the generated intermediate data may be approximately uniformly distributed throughout memory blocks of the distributed memory cluster.

After storing the intermediate data, the controlling apparatus may select a location of a reducer based on the location selection rule and the memory cluster structure information. Particularly, a computing node may be selected from a server rack including a storage node storing intermediate data greater than a given intermediate data amount at step S560. Then, the selected computing node may be assigned to the corresponding storage node at step S570, and the selected computing nodes may be controlled to perform a reduce function at step S580.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A distributed computing system comprising:
    a computing node cluster including a plurality of computing nodes comprising first computing nodes that each generates associated data;
    a distributed memory cluster configured to store the associated data of the first computing nodes;
    a controlling node configured to select memory blocks of the associated data for distribution on the distributed memory cluster based on a node selection rule and memory cluster structure information, and to select second computing nodes from the computing node cluster based on a location selection rule and the memory cluster structure information,
    wherein the controller node is configured to select, as one of the selected second computing nodes, a computing node included in a server rack storing the associated data greater than a given data amount, and to control the selected computing node to process the data stored in the same server rack.

2. The distributed computing system of claim 1, wherein according to the node selection rule, the controller node is configured to:
    assign the associated data to server racks included in the distributed memory cluster; and
    select the memory blocks from each of the server racks up to a number of the generated data assigned to each server rack.

3. The distributed computing system of claim 2, wherein the controller node is configured to use a round robin scheme to assign the associated data to the server racks.

4. The distributed computing system of claim 2, wherein the controlling node is configured to select, from memory blocks included in each of the server racks, a memory block having an available capacity greater than a given capacity.

5. The distributed computing system of claim 2, wherein the memory blocks are included in at least one storage node included in each of the server racks.

6. The distributed computing system of claim 1, wherein the controlling node is further configured to:
    control the selected computing node, as one of the second computing nodes, to process the data stored in another one of the server racks storing the associated data less than the given data amount.

7. The distributed computing system of claim 1, wherein:
    the distributed computing system performs a MapReduce operation;
    the first computing nodes perform a map function, and the associated data of the first computing nodes are intermediate data; and
    the second computing nodes perform a reduce function.

8. The distributed computing system of claim 7, wherein:
    a number of memory blocks required to store the generated data is determined based on partition information generated by a partition function of the MapReduce operation;
    a number of second computing nodes is determined to be equivalent to a number of storing nodes including the memory blocks required to store the generated data based on the partition information.

9. The distributed computing system of claim 1, wherein the memory cluster structure information includes identifiers of server racks included in the distributed memory cluster, identifiers of storage nodes included in the server racks, identifiers of memory blocks included in the storage nodes, identifiers of the first computing nodes generating the data, identifiers of the second computing node processing the stored data, and server rack switch information.

10. A method for controlling a distributed memory cluster having a plurality of server racks on a distributed computing system, the method comprising:

generating associated data from first computing nodes;

selecting memory blocks distributed on the distributed memory cluster based on a node selection rule and memory cluster structure information;

storing the generated, associated data at the selected memory blocks;

selecting second computing nodes based on a location selection rule and the memory cluster structure information; and controlling the selected second computing node to process the data stored in the selected memory block, wherein the selecting second computing nodes includes:

selecting, as the one of the second computing nodes, a computing node included in a server rack storing the generated, associated data greater than a given data amount; and controlling the selected computing node, as one of the second computing nodes, to process the data stored in the given server rack.

11. The method of claim 10, wherein the node selection rule of the selecting memory blocks includes:

assigning the generated, associated data to server racks included in the distributed memory cluster; and selecting the memory blocks from each of the server racks up to a number of the generated, associated data assigned to each of the server racks.

12. The method of claim 11, wherein in the assigning the generated, associated data to server racks, a round robin scheme is employed.

13. The method of claim 11, wherein in the selecting the memory blocks from each of the server racks, a memory block having an available capacity of at least a given capacity is selected from memory blocks included in each server rack.

14. The method of claim 11, wherein the memory blocks are included in at least one storage node included in each of the server racks.

15. The method of claim 10, wherein the location selection rule of the selecting second computing nodes further includes:

controlling the selected computing node, as one of the second computing nodes, to process the data stored in another one of the server racks storing the generated data less than the given data amount.

16. The method of claim 10, wherein:

the distributed computing system performs a MapReduce operation;

the first computing nodes perform a map function and the generated, associated data of the first computing nodes are intermediate data; and the second computing nodes perform a reduce function.

17. The method of claim 16, wherein:

a number of memory blocks required to store the generated, associated data is determined based on partition information generated by a partition function of the MapReduce operation;

a number of second computing nodes is determined to be equivalent to a number of storing nodes including the memory blocks required to store the generated data based on the partition information.

18. The method of claim 10, wherein the memory cluster structure information includes identifiers of server racks included in the distributed memory cluster, identifiers of storage nodes included in the server racks, identifiers of memory blocks included in the storage nodes, identifiers of the first computing nodes generating the data, identifiers of the second computing node processing the stored data, and server rack switch information.

* * * * *